Figure 2:
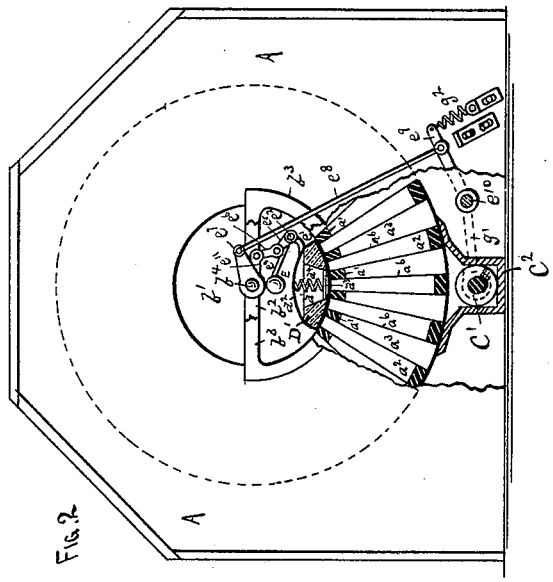

(No Model.) 2 Sheets—Sheet 1.

P. M. NELSON.
DUST COLLECTOR.

No. 338,765. Patented Mar. 30, 1886.

WITNESSES.
Wm Graham
H. S. Webster.

Peter M. Nelson.
INVENTOR BY
Charles N. Woodward.
Atty.

(No Model.)  2 Sheets—Sheet 2.

P. M. NELSON.
DUST COLLECTOR.

No. 338,765.  Patented Mar. 30, 1886.

WITNESSES.
A. S. Mayo.
H. B. Webster.

Peter M. Nelson,
INVENTOR, BY
Charles N. Woodward
Atty.

UNITED STATES PATENT OFFICE.

PETER M. NELSON, OF MINNEAPOLIS, MINNESOTA.

DUST-COLLECTOR.

SPECIFICATION forming part of Letters Patent No. 338,765, dated March 30, 1886.

Application filed May 6, 1885. Serial No. 164,615. (No model.)

*To all whom it may concern:*

Be it known that I, PETER M. NELSON, a subject of the King of Norway and Sweden, having declared my intention of becoming a citizen of the United States, residing at Minneapolis, Hennepin county, Minnesota, have invented certain new and useful Improvements in Dust-Collectors, of which the following is a specification.

The invention relates to the dust-collectors used in flouring-mills for removing the dust from the exhaust-air from middlings-purifiers, flour-bolts, millstones, rolls, bran-dusters, centrifugal reels, and similar machines, which impregnate the air passing through them with dust.

This invention may be applied to nearly all of the well-known forms of dust-collectors in use, but is more particularly applicable to the form illustrated in the drawings. I do not wish to be limited, however, in the application of the invention to any particular form of machines, as the invention may be applied to other forms by slight and unimportant modifications; but for the purpose of illustration I have shown in the drawings, in—

Figure 4:
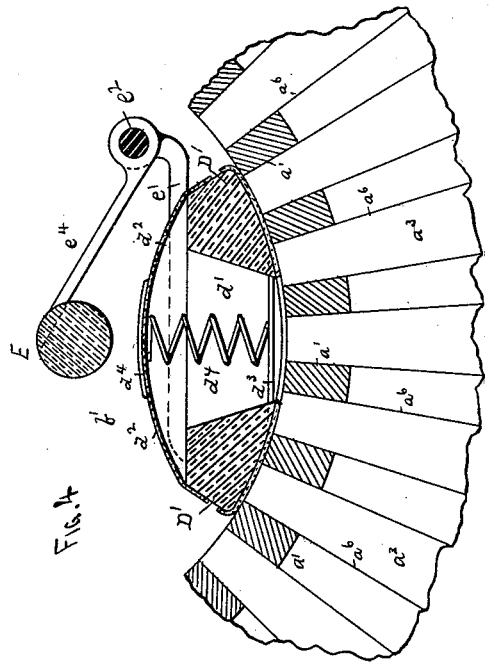
Figure 1:
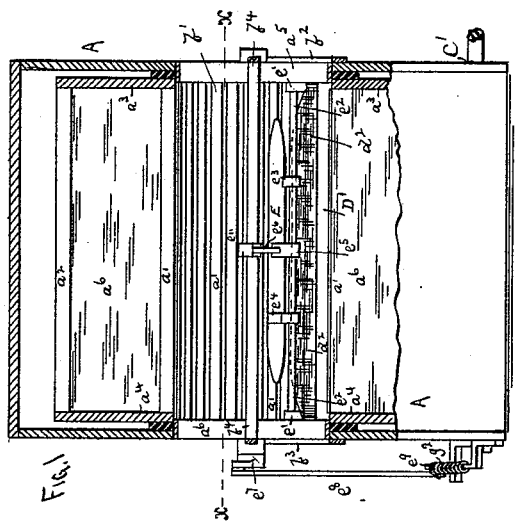
Figure 3:
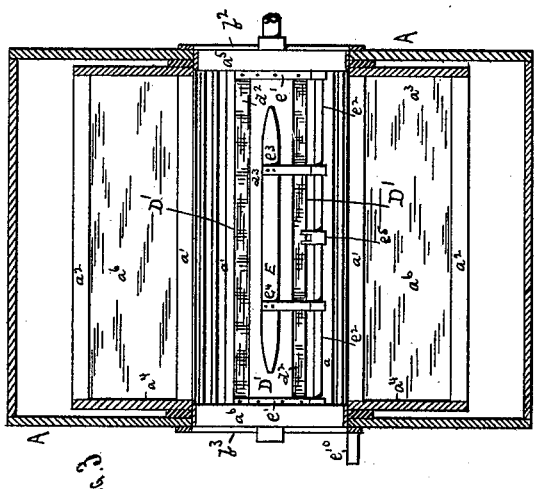
Figure 5:
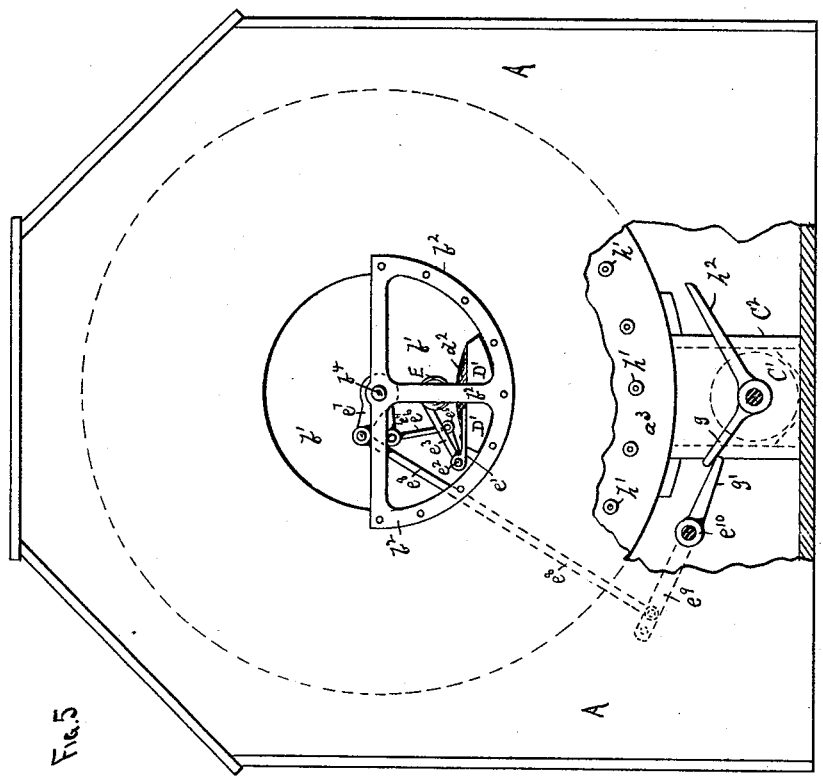

Figure 1, a sectional side elevation, in Fig. 2 an end elevation, partly in section, and in Fig. 3 a section on the line $x$ $x$ of Fig. 1, with the central knocker-shaft removed, of an approved form of dust-collector with my invention applied thereto. Fig. 4 is an enlarged detail of the principal part of the invention as applied to this machine. Fig. 5 represents a partly sectional end elevation of the machine opposite to that shown in Fig. 2, to illustrate more fully the manner of transmitting the intermittent motion to the balloon and the concussion-producing mechanism.

A is an outer casing, in which is arranged to be revolved a "balloon-frame" or reel, formed of ribs $a'$, surrounding a central open space, $b'$, and of another row of similar ribs, $a^2$, parallel with the inner row, the two sets of ribs being connected by the ends or heads $a^3$ and $a^4$, the whole being adapted to be revolved about rings $a^5$ and $a^6$, attached to the casing of the machine. There are many different mechanisms in use for mounting this balloon frame or reel; but the form shown is one in common use.

Across the ends of the casing opposite the central open space, $b'$, are two semicircular frames, $b^2$ $b^3$, in which a central shaft, $b^4$, is arranged, the shaft passing through the central opening.

Below the balloon frame or reel in the casing A is a conveyer, C', in a trough, C². The upper part of this trough is extended out at each side to form shut-off partitions, against which the balloon-frame revolves, so that three or more of the outer ribs, $a^2$, are always above the trough C². The ribs $a'$ $a^2$ are covered with the dust-collecting fabric $a^6$, in the ordinary manner. Lying along the bottom of the central opening, $b'$, and with its ends attached to the semicircular frames $b^2$ $b^3$, is a shut-off plate, D', its under side being covered with felt, flannel, or other suitable material, to form a packing between it and the ribs $a'$, and also between the plate D' and the ends $a^3$ $a^4$ of the balloon-frame, and having an opening or slot or cavity, $d'$, down through it a little wider than the space between two of the ribs $a'$, and flaring out at the top of the plate D'. The slot $d'$ does not extend through the ends of the plate D', but is stopped short thereof, and over the top of this shut-off plate is stretched a covering or diaphragm, $d^2$, of rubber or other suitable air-tight material, completely shutting off all communication between the open slot $d'$ and the central open space, $b'$. Across the bottom of the slot $d'$ are secured a series of small bars, $d^3$, upon which rest small spiral springs $d^4$. The springs serve to support the rubber covering or diaphragm $d^2$ and hold it elevated, as shown in Figs. 2 and 4. Thus the only communication that exists between the open space $b'$ and the slot $d'$ is through the cloth or fabric $a^6$, composing the clothing of the balloon-frame. That portion of the balloon-frame or reel which is for the time being located between the cut-off plate and the trough C² constitutes a still-air chamber, the sections of the reel within said space being completely isolated from the air-current which conveys the dust-laden air to the dust-collecting medium.

Attached by end brackets, $e'$, to the ends of the shut-off plate D' is a small shaft, $e^2$, to which a knocker-roll, E, is connected by arms $e^3$ $e^4$. At some point on this shaft $e^2$ is secured a small crank-arm, $e^5$, connected by a rod, $e^6$, to another crank-arm, $e''$, on the central shaft, $b^4$. On one end of the central shaft, $b^4$, out-side of the casing A, is secured another crank-arm, $e^7$, connected by a rod, $e^8$, to still another crank-arm, $e^9$, on a shaft, $e^{10}$, the latter being journaled across the lower part of the machine, alongside of the conveyer C'. Upon one end of the conveyer-shaft is secured a small "cam" or lug, $g$, which is adapted to strike an arm, $g'$, on the shaft $e^{10}$ once during every revolution of the conveyer, to oscillate the shaft $e^{10}$.

On one of the ends $a^3$ or $a^4$ of the balloon-frame is arranged a series of outwardly-projecting pins $h'$, corresponding in number with the ribs $a'$ and $a^2$. Upon these pins an arm, $h^2$, on the conveyer-shaft strikes, and thus revolves the balloon the distance of the space between a pair of the ribs at each revolution of the conveyer. The arm $h^2$ acts only during a very small portion of the complete revolution of the conveyer, so that the balloon is revolved intermittently, as will be readily understood by reference to Fig. 5, which shows the arm $g$ just on the point of acting on the arm $g'$ to raise the concussion-producing roll E. The arm $h^2$ is so set on the conveyer-shaft that it will not act upon the balloon-frame until after the roll E has struck its blow, so that the balloon will remain stationary while the concussion is being produced upon its clothing. By this connection of rods and crank-arms with the knocker-roll E the latter is raised upward once during every revolution of the conveyer.

A spring, $g^2$, is connected to the outer end of the crank-arm $e^9$, to draw it downward when released by the cam on the conveyer-shaft, and cause the knocker-roll to strike the covering or diaphragm $d^2$ a sharp blow and displace the air beneath it, and thereby drive the adhering particles of dust from the dust-collecting fabric connecting the ribs immediately below the shut-off plate and above the shut-off sides of the conveyer-trough $C^2$.

The drawings show one form of mechanism for producing the blow upon the covering $d^2$ and intermittently revolving the balloon; but I do not wish to be confined to this specific arrangement, as I am aware that many other suitable mechanical devices may be employed. Any device that will produce a sharp blow at intervals upon the air-tight covering or diaphragm $d^2$ may be used. In this form of machine the constant impinging on the fabric $a^6$ of the dust contained in the air which passes through the machine soon clogs up the fabric, and in order to remove this dust it is necessary to shut off the air-currents from the section of the balloon while being thus cleaned. This is done, as before described, by means of the shut-off plate D' and of the upwardly-projecting sides of the conveyer-trough $C^2$, the section of fabric between these two parts being withdrawn from the air-current for the time being. This hollow cut-off plate, with the taut diaphragm stretched over it, and the knocker, constitute a pneumatic device for causing a sudden displacement and rapid vibration of the air confined within the isolated portions of the dust-collecting medium.

The operating-lever controlling the motion of the knocking-roller E will be so arranged as to strike a number of blows during each pause in the revolution of the balloon-frame, or one blow during each of such pauses, as may be preferred or as circumstances may determine. A canvas or other protecting-strip, $d^4$, will be placed over the rubber covering $d^2$ to receive the blows of the knocker-roll E and protect the rubber from abrasion thereby. Any other suitable material besides rubber may be used for the covering $d^2$.

I claim a great advantage by the use of this sudden displacement or concussion of the confined air, as it is thus thrown suddenly into very rapid vibrations, at once reaching and effecting every part of the fabric which is for the time being shut off from the direct current, thereby thoroughly cleaning and driving the adhering dust from the fabric.

Having thus described my invention, what I claim as new is—

1. In a dust-collector, a dust-collecting medium, a still-air chamber, and a cut-off for effecting an isolation of a portion of said medium from the air-current, in combination with a pneumatic device acting at intervals through said cut-off to cause a vibration of the air within the isolated portion of said medium.

2. In a dust-collector, a reel having a series of cloth-covered compartments and a central opening, and mechanism for rotating said reel intermittently, in combination with a still-air chamber, a cut-off for isolating from the fan-blast the compartments within the still-air chamber, and a pneumatic device for vibrating the air within said compartments.

3. In a dust-collector, a dust-collecting medium, a still-air chamber, and a cut-off for effecting an isolation of a portion of said medium from the air-current, said cut-off plate having an opening communicating with said isolated portion, in combination with a taut diaphragm stretched above said cut-off and inclosing an air-space above said cut-off, and a knocker which strikes said diaphragm, substantially as set forth.

4. In a dust-collector, a reel having a series of cloth-covered compartments and a central opening, and mechanism for rotating said reel intermittently, in combination with a still-air chamber, a cut-off for isolating from the fan-blast the compartments within the still-air chamber, said cut-off having a slit extending therethrough, a taut diaphragm stretched above said cut-off and inclosing an air-space above said cut-off, and a knocker which strikes said diaphragm intermittently.

5. In a dust-collector, a reel having a series of cloth-covered compartments and a central opening, and mechanism for rotating said reel intermittently, in combination with a still-air chamber, a hollow cut-off plate which isolates from the air-blast the compartments within the still-air chamber, said cut-off plate having a slit or opening communicating with said isolated compartments, a flexible air-tight diaphragm stretched over said hollow cut-off plate, springs interposed between the plate and diaphragm, and a knocker which strikes said diaphragm intermittently.

In testimony whereof I have hereunto set my hand in the presence of two subscribing witnesses.

PETER M. NELSON.

Witnesses:
R. W. CUMMINGS,
C. N. WOODWARD.